Nov. 14, 1967  F. J. ADAMS  3,352,170

POWER ASSISTED STEERING OR LIKE CONTROL GEAR

Filed March 28, 1966  2 Sheets-Sheet 1

United States Patent Office 3,352,170
Patented Nov. 14, 1967

3,352,170
POWER ASSISTED STEERING OR LIKE
CONTROL GEAR
Frederick John Adams, Campton, near Shefford, England, assignor to Hydrosteer Limited, Luton, England, a British company
Filed Mar. 28, 1966, Ser. No. 537,836
Claims priority, application Great Britain,
Apr. 8, 1965, 14,911/65
8 Claims. (Cl. 74—388)

This invention relates to a modification in the power-assisted steering mechanism described in co-pending application Ser. No. 490,394, filed Sept. 27, 1965.

That specification disclosed a steering mechanism of the rack and pinion kind in which the reaction between the rack and the pinion resulted in the operation of a valve for controlling power assistance to the steering. The reaction was applied to one end of a pivoted lever and an arm actuating the valve was attached to the other end of the lever. The fulcrum or pivot of the lever was located between the two ends of the lever that is to say the lever was of the first kind. The present invention uses the same reaction for operating the valve but the force is transmitted by means of a different mechanism which does not use a lever of the first kind.

According to this invention a steering mechanism of the rack and pinion kind and in which the reaction between the rack and the pinion in a steering box through which the rack slides is utilized to operate a valve for controlling hydraulic power assistance to the steering, is characterized in that the pinion is mounted in bearings which straddle the rack and are carried on a rocking element adapted to rock on a pivot pin the axis of which is substantially parallel to the axis of the pinion, the pivot pin forming a bearing between the rocking element and the steering box which has a saddle to maintain engagement between the rack and the pinion, the rocking movements of the rocking element and of the pinion about the axis of the pivot pin caused by the reaction between the rack and the pinion being transmitted to the valve through an arm or rod by an articulated connection which is spaced from the axis of the pivot pin and which affords angular freedom about an axis parallel to that of the pivot pin.

The arm which transmits the reaction to the valve means may be an extension of the rocking element or it may be secured to the pin. In still another arrangement the valve means may be operated by a rod mounted on a bearing carried on an extension of the shank of the pinion.

Figure 1:
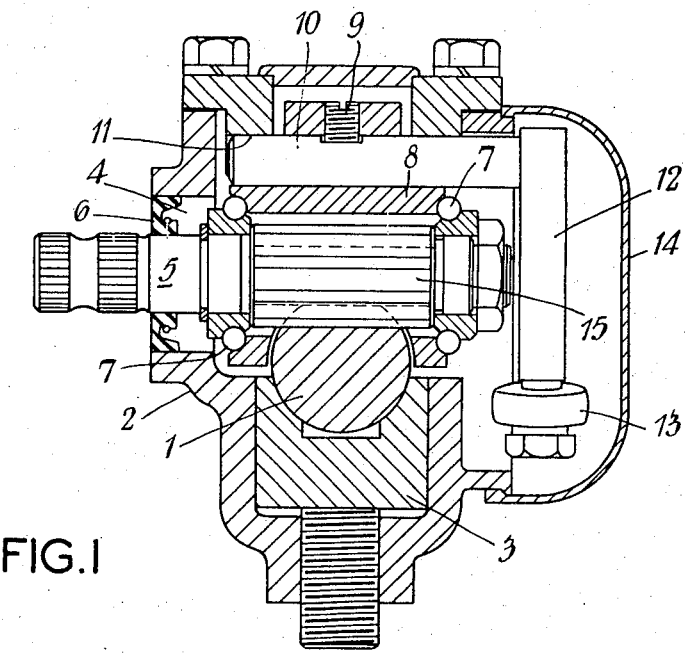
Figure 2:
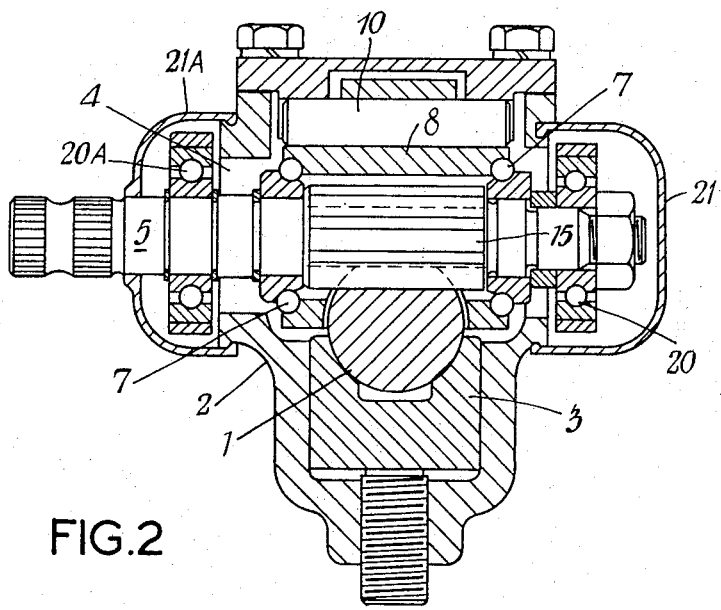
Figure 3:
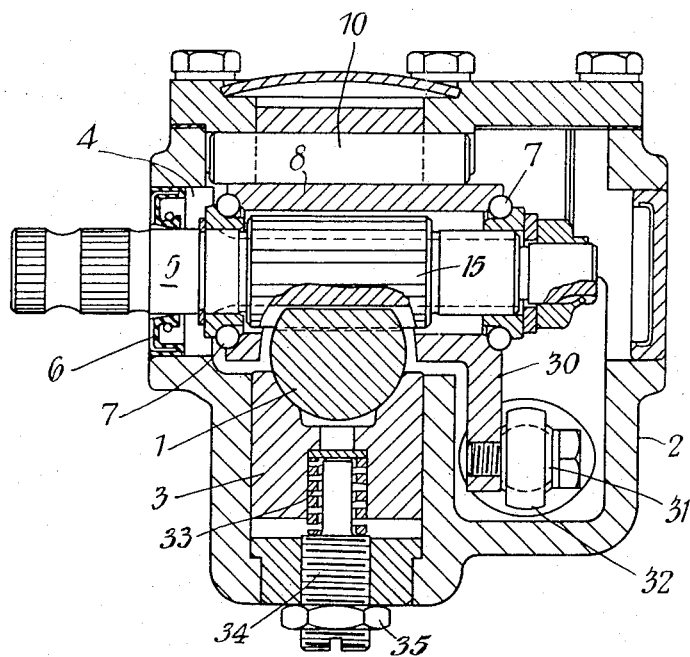

The invention will now be further described by way of example with reference to the accompanying drawings in which:

FIGURE 1 is a cross-section through a steering box showing one embodiment of the invention; and FIGURES 2 and 3 are similar views showing a second and a third embodiment.

In each of the figures, the rack bar is represented at 1 and it is mounted to slide in a steering box 2, preferably being adjustably borne on a saddle 3 as in known practice.

In FIGURE 1, the steering box 2 has an opening at 4 through which passes the steering-column extension shaft 5, there being a flexible seal 6 to retain lubricant. The shaft 5, on which a pinion 15 is rigidly fixed, rotates in two ball-bearing races at 7, supported by a rocking element 8 which is locked by a setscrew 9 to a pivot pin 10. The pin 10 is borne by the structure of the box 2, either by half-bearings, as drawn at 11 or by complete bearings. To one end of the pin 10 there is secured an arm 12 which is radially longer than the distance between the axes of 5 and 10 so that it is in effect a lever. To the arm 12 there is jointed, by means of an articulated connection 13, the valve-actuating rod, which passes through a flexible sleeve (not shown) sealing it with an end cap 14 attached to the box 2 and forming a closure. It is assumed that the servo valve actuated by the rod, has positively limited small stroke. When the steering column is rotated against resistance, the reaction between the rack and the pinion causes the element 8 to rock, operating the servo valve through the arm 12 and valve rod, whereby power assistance under the control of the servo valve results.

In the embodiment illustrated in FIGURE 2, wherein like parts have like references, the arm 12 is dispensed with and the valve rod is mounted by an articulated connection, on the shaft 5 through the medium of a ball bearing race 20A carried on an extension of the shank of the pinion. The rocking element 8 rocks as before. The valve rod is sealed to an end cap 21A which is of flexible material and seals with the shaft 5 and the box 2. A like rod bearing 20 and end cap 21 may be provided at the other side of the box 2, and the two rods may either be conjoined to operate a single servo valve, or each operate one servo valve. In this case it will be seen that there is no difference of effective radius between the element 8 and the swing of the valve rod bearings, so that there is no mechanical advantage in the usual sense of a "lever."

In FIGURE 3, it will be seen that the rocking element 8 has an arm-like extension 30 to which is jointed at 31 by means of an articulated connection the valve rod which operates the servo valve, the end of this rod being shown at 32. The saddle 3 is urged against the rack 1 by a spring 33 which is adjustable by means of a screw 34 having a locknut 35.

It is to be understood that the actual movement, between extremes of range, of the pinion 15, is within the range of thousandths of an inch. The valve unit must therefore be responsive, in one or the other sense of direction, within such limits.

I claim:

1. A steering mechanism of the rack and pinion kind in which the reaction between the rack and the pinion in a steering box through which the rack slides is utilized to operate a valve for controlling hydraulic power assistance to the steering, comprising bearings straddling said rack and in which said pinion is mounted, a rocking element carrying said bearings, a pivot pin forming a bearing between said rocking element and said steering box, a saddle in said steering box for maintaining engagement between said rack and said pinion, an articulated connection connected to said valve, spaced from said pivot pin and affording angular freedom about an axis parallel to that of said pivot pin, and transmitting means for transmitting the rocking movements of said rocking element and said pinion about the axis of said pivot pin, caused by the reaction between said rack and said pinion, to said articulated connection for transmission thereby to said valve.

2. A steering mechanism as claimed in claim 1, wherein said transmitting means in an arm forming an extension to said rocking element.

3. A steering mechanism as claimed in claim 2, further comprising means whereby the body of said steering box is integrated with a structural part of a vehicle embodying the steering mechanism.

4. A steering mechanism as claimed in claim 1, wherein said transmitting means is an arm secured to said pivot pin.

5. A steering mechanism as claimed in claim 4, further comprising means whereby the body of said steering box is integrated with a structural part of a vehicle embodying the steering mechanism.

6. A steering mechanism as claimed in claim 1, wherein said transmitting means is a rod mounted on an extension of the shank of said pinion.

7. A steering mechanism as claimed in claim 1, further comprising a shank on which said pinion is mounted, an extension of said shank at each end of said pinion, a bearing on each said extension, a forked end on said transmitting means, said transmitting means being in the form of a rod, and two arms forming the legs of said forked end, each arm being mounted on one of said bearings on said extensions.

8. A steering mechanism as claimed in claim 7, further comprising means whereby the body of said steering box is integrated with a structural part of a vehicle embodying the steering mechanism.

References Cited

UNITED STATES PATENTS

| | | | |
|---|---|---|---|
| 3,139,765 | 7/1964 | Heacock | 74—388 |
| 3,157,061 | 11/1964 | Parker | 74—498 |

DONLEY J. STOCKING, *Primary Examiner.*

L. H. GERIN, *Assistant Examiner.*